United States Patent [19]

Reighart, II

[11] 4,093,160
[45] June 6, 1978

[54] FREE VORTEX AIRCRAFT

[76] Inventor: Ray R. Reighart, II, 4778 Hillcrest North, Hilliard, Ohio 43026

[21] Appl. No.: 732,996

[22] Filed: Oct. 15, 1976

[51] Int. Cl.² .............................................. B64C 23/06
[52] U.S. Cl. .................................... 244/199; 244/113; 244/209
[58] Field of Search ................. 244/36, 34 R, 13, 12.1, 244/15, 23 R, 199, 201, 204, 207, 208, 209, 213, 113, 91

[56] References Cited

U.S. PATENT DOCUMENTS

| 2,263,992 | 11/1941 | Joyce | 244/213 |
| 2,480,036 | 8/1949 | Lloyd et al. | 244/209 |
| 2,508,288 | 5/1950 | Owner et al. | 244/209 |
| 2,619,302 | 11/1952 | Loeding | 244/36 |
| 2,751,168 | 6/1956 | Stalker | 244/209 |
| 2,841,182 | 7/1958 | Sala | 244/209 |
| 3,193,215 | 7/1965 | Dunham | 244/36 |
| 3,831,885 | 8/1974 | Kasper | 244/199 |
| 4,017,041 | 4/1977 | Nelson | 244/91 |

Primary Examiner—Galen L. Barefoot
Attorney, Agent, or Firm—Frease & Bishop

[57] ABSTRACT

An aircraft which produces a free vortex to provide the lift for takeoff and landing procedures has a single centrally mounted engine which supplies both the forward thrust to the aircraft and the spaced pumping action for strengthening and maintaining the free vortex. A shield on the aircraft causes the shedding of vorticity into a cavity-like region behind the shield. A vortex guiding duct extends transversely beneath the aircraft frame and has a pair of inlet openings at the ends of the cavity region. A thruster duct extends longitudinally centrally of the frame and communicates with the vortex duct. An engine is mounted in the thruster duct and supplies forward thrust for the aircraft while simultaneously pumping air from the ends of the cavity region through the vortex duct. This pumping action retains, augments and concentrates the vorticity and results in the formation of a generally circularly-shaped free vortex stretching transversely across the cavity region and through the vortex duct. Means are provided for retracting the shield simultaneously with the closing of the vortex duct inlets to extinguish the free vortex after the aircraft is in flight to enable the aircraft speed to be substantially increased.

19 Claims, 10 Drawing Figures

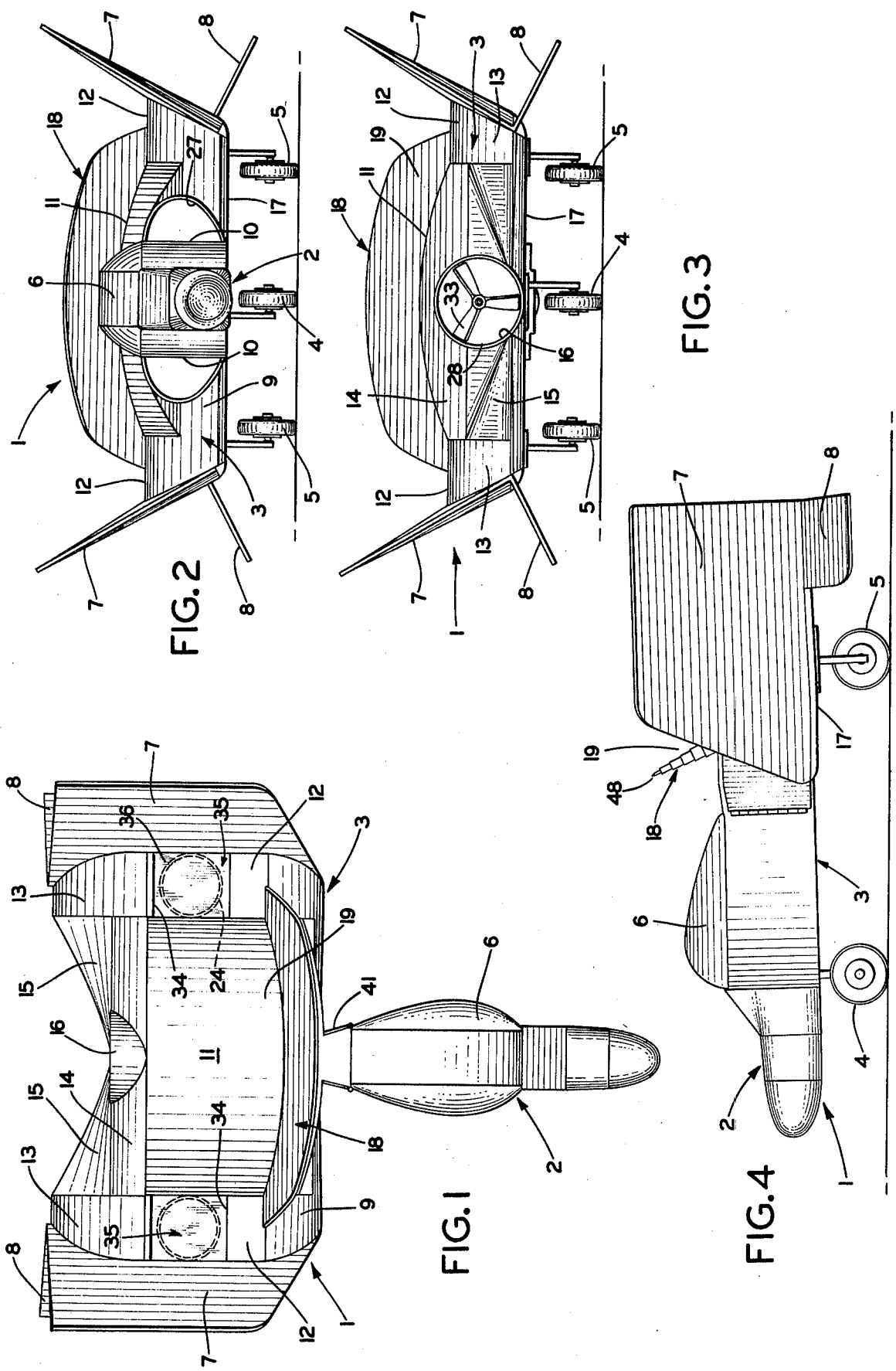

FREE VORTEX AIRCRAFT

CROSS-REFERENCE TO RELATED PATENT

This invention involves improvements in the construction of my free vortex aircraft set forth in U.S. Pat. No. 3,934,844, issued Jan. 27, 1976.

BACKGROUND OF THE INVENTION

1. Field of the Invention

The invention relates to heavier-than-air aircraft in which the lift is produced on the body of the aircraft by a free vortex and in particular to such an aircraft having a centrally mounted engine which produces both the forward thrust for the aircraft and intensifies the lift producing free vortex. More particularly, the invention relates to an aircraft in which a free vortex is produced to provide the lift for takeoffs and landings, and in which the free vortex is eliminated during normal flight to permit the speed of the aircraft to be substantially increased.

2. Description of the Prior Art

There are numerous types and styles of aircraft produced using conventional propeller-driven and jet engine-driven designs in which the lift is produced on the wings of the aircraft by the movements of the air currents. There alos are various constructions of wingless aircraft, usually having a saucer-like disc shape in which air currents rotate an annular member or are deflected through an open bottom to provide lift for the disc. Likewise, there are other styles of aircraft known as ground effect machines in which a cushion of air is provided beneath the craft to support the craft a short distance above the ground for movement therealong.

Many of the problems associated with these types of aircraft are described in and are eliminated by the free vortex aircraft construction described in my U.S. Pat. No. 3,934,844. Although the free vortex construction of this patent eliminates many of the problems, certain limitations exist. The use of a pair of spaced thruster and vortex pumping engines, if not fully synchronized, may produce an unbalance or yaw effect on the aircraft increasing the problems of maintaining its stability. Likewise, the use of two or more engines to produce and maintain the free vortex and to provide the forward thrust increases the cost of the aircraft in contrast to the use of a single engine which can provide both functions and achieve the same results.

Although the generation of the lift producing free vortex is highly desirable for takeoffs and landings, the vortex decreases considerably the cruising or flight speed of the aircraft. If too great a speed is reached by the aircraft, the vortex will "blow away", eliminating most of the lift being produced on the body of the aircraft, seriously affecting its airborn ability. Furthermore, the vortex producing thrust and pumping engines will continually attempt to create new lifting vortexes in the vortex producing region of the aircraft frame which are continuously "blown away", producing a serious drag on the aircraft.

Thus, the need has existed for an aircraft construction which produces a free vortex to provide the necessary lift for takeoffs and landings which reduces the runway length required and increases the safety of the aircraft, and which permits elimination of the vortex once the aircraft is in flight thereby increasing the flight speed, and which requires only a single engine for producing both the thrust and free vortex pumping action.

SUMMARY OF THE INVENTION

Objectives of the invention include providing an improved free vortex aircraft construction which requires only a single centrally mounted engine for producing both the forward thrust and pumping action for the lift producing free vortex, thereby eliminating undesirable yaw on the aircraft and reducing the cost thereof; providing such an improved aircraft construction in which the lifting vortex is eliminated between takeoff and landing procedures to increase the speed of the aircraft by retracting the vorticity-producing front shield and by eliminating the vortex core pumping action of the engine by covering of the vortex air duct inlets; providing such an aircraft construction in which the generated standing free vortex is maintained in a stable condition while being gradually eliminated during flight by decreasing the length of the vortex while decreasing its strength by controlling the size and location of the inlet air duct openings and the effective width of the shield; and providing such an aircraft construction which provides the advantage of greatly increased lift with a minimum amount of power for takeoffs and landings by generation of a free vortex, as well as providing an aircraft being able to travel at a high rate of speed during flight by eliminating the lifting free vortex.

These objectives and advantages are obtained by the improved free vortex aircraft construction, the general nature of which may be stated as including frame means; shield means mounted on the frame means to generate and shed a substantial amount of vorticity into the air when the aircraft moves forwardly through the air, with said shield means and frame means providing an upper vortex forming zone downwind of the shield means; the shield means being movably mounted for movement between extended and retracted positions; vortex duct means located within the frame means, generally beneath the upper vortex forming zone, and extending transversely across the frame means providing a lower vortex zone, with said duct means being provided with a pair of spaced inlet openings communicating with the ends of the upper vortex forming zone; thruster air duct means located within and extending longitudinally along the frame means and communicating with the vortex duct means intermediate the spaced inlet openings; engine means mounted centrally on the frame means and communicating with the thruster duct means to provide thrust for moving the aircraft forwardly through the air and for pumping air from the upper vortex forming zone through the inlet duct openings and vortex duct means to retain and concentrate the vorticity within said upper vortex zone to form a free vortex of low pressure air extending in a generally circular manner across the frame means and through the vortex duct means, with said free vortex acting on the frame means and vortex duct means to produce lift on the aircraft; closure means movably mounted with respect to the spaced inlet openings of the vortex duct means for opening and closing said inlet openings for creating the free vortex when the shield means is in extended position and the inlet openings are open, and for extinguishing the free vortex by moving the shield means to retracted position and closing the inlet openings.

BRIEF DESCRIPTION OF THE DRAWINGS

A preferred embodiment of the invention — illustrative of the best mode in which applicant has contemplated applying the principles — is set forth in the following description and shown in the accompanying drawings, and is particularly and distinctly pointed out and set forth in the appended claims.

FIG. 1 is a top plan view of the improved free vortex aircraft construction with the vortex producing shield in raised position and with the vortex inlet duct openings in closed position;

FIG. 2 is a front elevation of the improved aircraft shown in FIG. 1;

FIG. 3 is a rear elevation of the improved aircraft shown in FIGS. 1 and 2;

FIG. 4 is a right-hand side elevational view of the improved aircraft of FIG. 1;

Similar numerals refer to similar parts throughout the drawings.

DESCRIPTION OF THE PREFERRED EMBODIMENT

Figure 5:
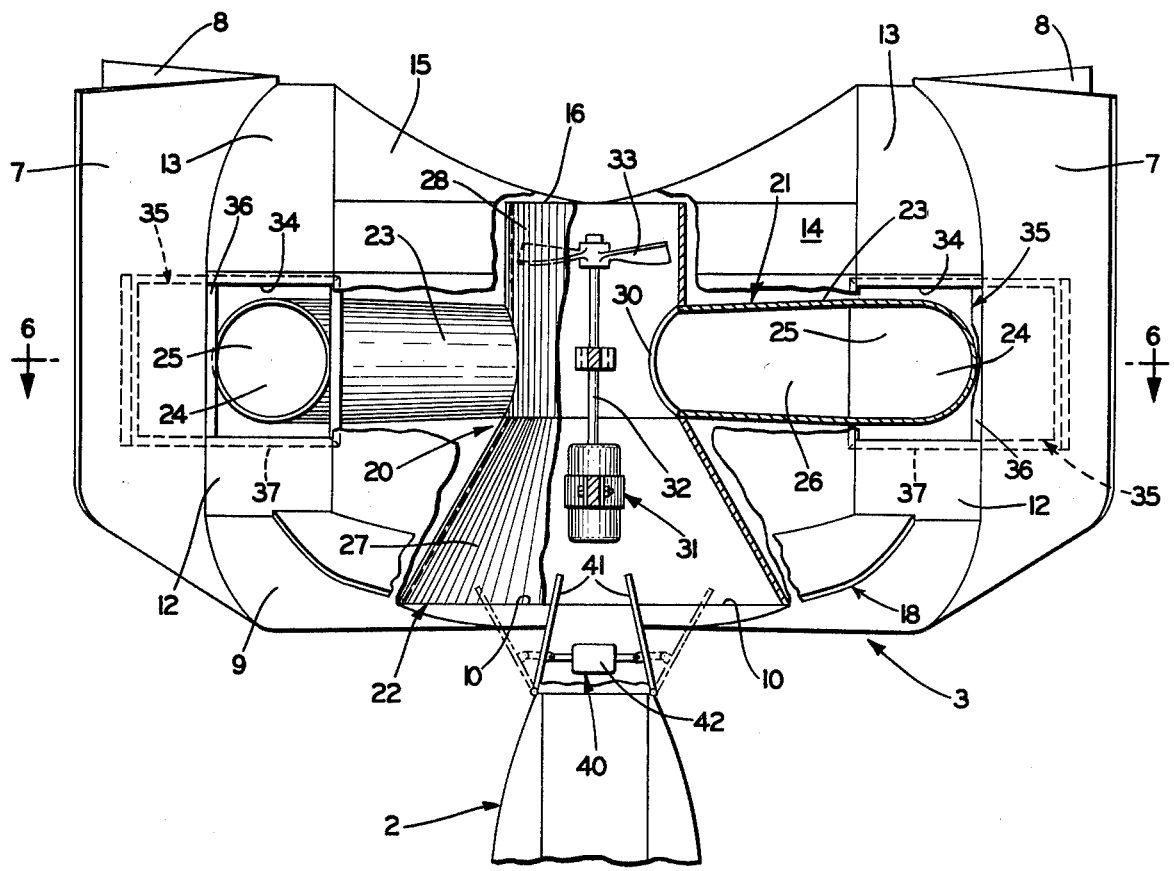
FIG. 5 is an enlarged fragmentary top plan view with portions broken away and in section of the aircraft shown in FIG. 1 with the vortex inlet ducts in open position.

The improved free vortex aircraft construction of the invention is indicated generally at 1 and is shown particularly in FIGS. 1 through 4. Aircraft 1 includes a front forwardly extending nose section 2 and a main body section 3. Nose section 2 is supported by a front wheel assembly 4, with main section 3 being supported by a pair of spaced rear wheel assemblies 5. Nose section 2 includes a cockpit area 6 for receiving a pilot and for housing the usual control mechanisms for aircraft construction 1.

Main body section 3 includes a pair of end stabilizing fins 7 extending in an inclined upwardly outwardly direction. A second pair of stabilizing fins 8 is mounted on the bottom of main fins 7 and extend downwardly outwardly at generally right angles with respect to fins 7. The front portion of main section 3 is formed by an upwardly rearwardly curved surface 9 (FIGS. 1 and 2), formed with a pair of thruster inlet openings 10 on the sides of nose section 2. Surface 9 terminates in a generally arcuate top deck surface 11 which terminates in a pair of flat side areas 12 adjacent main fins 7. The rear of surfaces 12 terminate in a downwardly curved portion 13. The rear of deck 11 also is curved downwardly at 14 and terminates along with curved surfaces 13 in a pair of inwardly downwardly projecting areas 15 which terminate and form thruster outlet opening 16 (FIGS. 1 and 3). A generally flat bottom wall 17 completes the general structure of main body section 3.

A vorticity-producing shield 18 is retractably mounted on the front portion of main section 3 and extends upwardly forwardly at an angle of approximately 20° with respect to the vertical, as shown in FIG. 4. Shield 18 forms a cavity-like region 19 behind shield 18 and located between fins 7 and main deck 11, the purpose of which is discussed more fully below. Shield 18 has an arcuate shape and a relatively sharp top edge 29.

In accordance with the invention, an air duct assembly, indicated generally at 20 (FIGS. 5 and 6), is mounted within main body section 3 between deck 11 and bottom wall 17. Duct assembly 20 consists of a vortex guiding duct 21 and a thruster duct 22. Vortex duct 21 is formed by a pair of cylindrically-shaped transversely extending ducts 23 which terminate in a pair of spaced outer circular inlet openings 24. Ducts 23 are formed by an outer generally 90° bend 25 (FIG. 6) and a tapered straight line cylindrical section 26. Inlet openings 24 are formed by the upper ends of bends 25.

Thruster duct 22 includes a front conical section 27 and a rear cylindrical section 28. The inner ends of vortex duct sections 26 are attached to cylindrical section 28 adjacent the rear of conical section 27 and provide communication with thruster duct 22 through openings 30 (FIG. 5). The rear end of cylindrical section 28 forms thruster outlet opening 16 with the front end of conical duct section 27 forming thruster inlet openings 10.

An engine 31 is mounted within thruster duct 22 and includes a power-driven shaft 32 and a propeller 33. Propeller 33 is located within cylindrical duct section 28 rearwardly of openings 30 which communicate with vortex ducts 23 in order to draw air through both inlet openings 10 and duct openings 24. Engine 31 is shown diagrammatically in FIG. 5 and may consist of a pair of engines in tandem or in side-by-side arrangement, if desired, and may be gasoline or jet powered without affecting the concept of the invention. If the aircraft were to be powered by a jet engine, the jet engine would have to be placed so that its air intake would pump air from the vortex ducts 23 as well as the thruster duct so it would have to be placed at the location of propeller 33 rather than the location of motor 31.

Vortex inlet openings 24 communicate with the vortex forming region 19 through openings 34 formed in flat side areas 12 of main body section 3. In further accordance with the invention, a pair of closure members 35 are slidably mounted within fins 7 and across openings 34 and duct inlet openings 24 for closing and opening duct inlet openings 24. Closure members 35 preferably consist of flexible panels 36, slidably mounted between a pair of spaced channels 37, mounted within fins 7 and adjacent openings 34. Panels 36 are operable by any suitable type of operating control means (not shown) for moving panels 36 between open and closed positions by actuation of control means within cockpit area 6. The panel control means may be hydraulic, pneumatic, electrical or the like. The surfaces 9, 11, 12, 13, 14, 15 and 17 of the main body 3, along with the closure members 35, are so shaped that the aircraft 1 becomes a streamlined lifting body aircraft when the shield 18 is retracted and the closure members 35 are closed.

A choke assembly 40 is mounted at the rear of nose section 2 at the inlet openings of thruster duct 22 for controlling the amount of air entering conical duct section 27 through thruster inlet openings 10. Assembly 40 includes a pair of closure flaps 41 pivotally connected to a hydraulic control unit 42 for moving flaps 41 between the fully open position (full lines, FIG. 5) to a partially closed position (dot-dash lines, FIG. 5). Choke assembly 40 controls the rate at which air is pumped by engine 31 through vortex duct openings 24 by regulating the airflow through thruster inlet openings 10.

Figure 7:
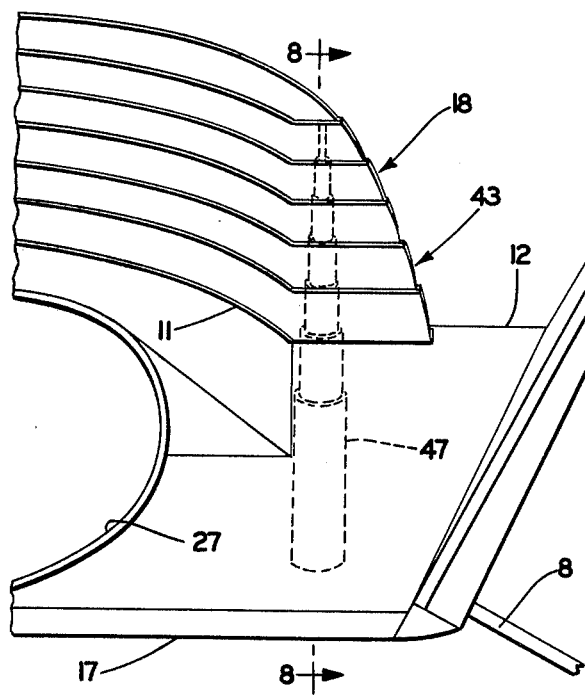
FIG. 7 is an enlarged fragmentary view of the vortex producing front shield in extended raised position.
Figure 9:
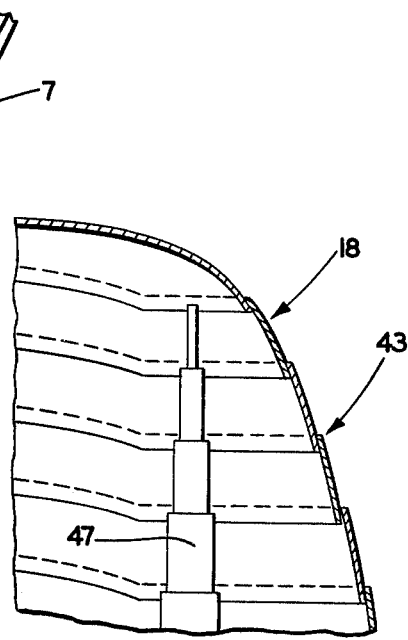
FIG. 9 is a fragmentary sectional view taken on line 9—9, FIG. 8.
Figure 10:
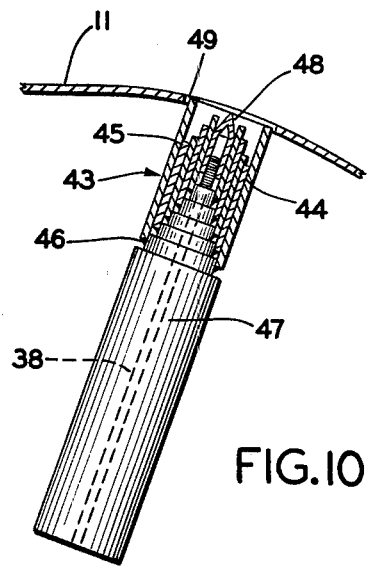
FIG. 10 is a fragmentary sectional view similar to FIG. 8 with the shield in fully retracted position.

Another main feature of the invention is the construction of shield 18, whereby it is retractable from its fully extended vorticity-producing position of FIG. 7 to a completely retracted concealed position of FIG. 10. One type of construction of shield 18 by which this can be accomplished is shown diagrammatically in FIGS. 7-10.

Shield 18 is formed by a plurality of shield segments which are indicated generally at 43, six of which are illustrated in the drawings. Each shield segment 43 is formed by a pair of spaced panels 44 and 45 (FIG. 8) which are secured at their lower ends by welds 46 to an associated piston 47. Pistons 47 preferably are hydraulically actuated and are telescopically mounted with respect to each other as are the individual pairs of shield panels 44 and 45. This telescoping arrangement enables shield 18 to be collapsed easily within main body section 3 and beneath deck 11 from its fully extended position of FIG. 8 to its collapsed or retracted position of FIG. 10. The pistons 47 are spring loaded by a compression spring 38 so that the shield segments do not separate from each other above the surface of the frame deck 11. Consequently, the shield preserves its smooth arcuate shape during the extension and retraction processes. The topmost shield segment 48 preferably has a V-shaped cross-sectional configuration. Shield 18 retracts within an elongated slot 49 formed in frame deck 11 when in retracted position to eliminate any wind resistance and drag due to an exposed upper shield end. Slot 49 may be covered by a flap or panel if desired, to provide a more streamlined construction.

Figure 6:
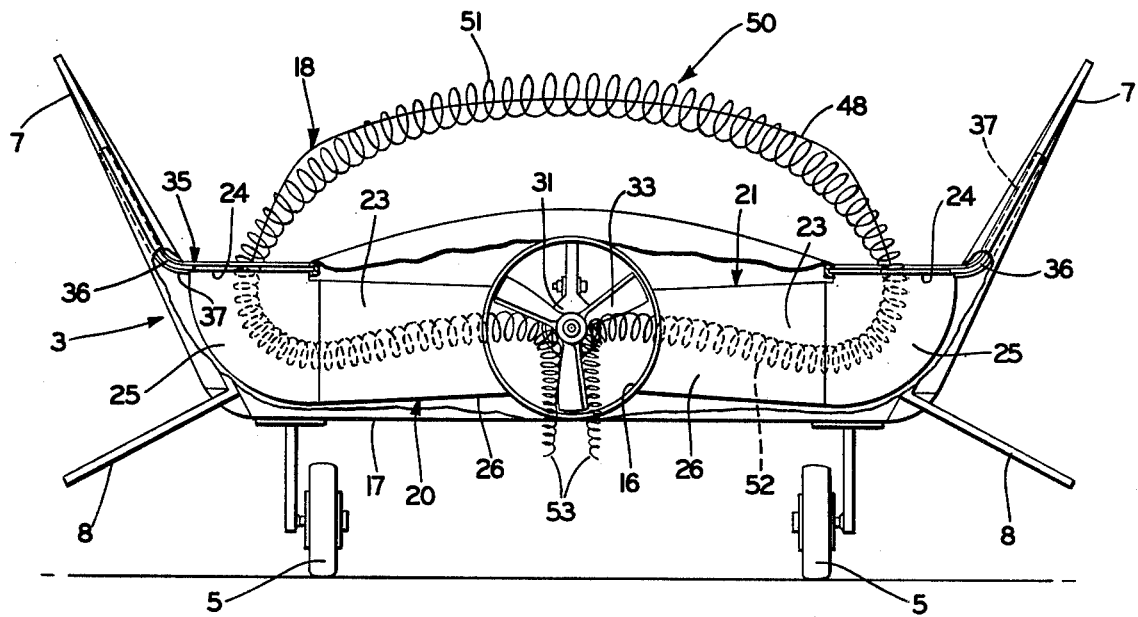
FIG. 6 is a fragmentary sectional view taken on line 6—6, FIG. 5, showing the formation of the free vortex.

The details of the theory of operation in forming a free standing vortex, indicated generally at 50 (FIG. 6), are described fully in my basic U.S. Pat. No. 3,934,844. Stated briefly, when the aircraft moves through the air or along the ground, powered by thrust engine 31, vorticity is shed from the relatively sharp top edge 29 or topmost shield segment 48 above vortex forming region 19. This vorticity is retained and concentrated into a strong lift-producing vortex 50 by the vortex stretching action of the pumping of the air from vortex region 19 through openings 24 of vortex guiding ducts 21. Vortex 50 forms downwind of shield 18 and has a generally flattened circular configuration, as shown in FIG. 6.

Vortex 50 has an upper, generally half-circular portion 51 which extends in an arcuate manner between inlet openings 24 across deck 11, and a lower or internal portion 52 which extends about duct bends 25 and through straight duct sections 26 and through openings 30 into cylindrical section 28 of thruster duct 22. The trailing end 53 of the vortex are discharged through thruster outlet opening 16.

Propeller 33 of thrust engine 31 draws a large volume of high-speed air through inlet openings 10 where it passes through thruster duct 22 and out of outlet opening 16 to provide the forward thrust for aircraft 1. Simultaneously with this thrust-producing movement of air by propeller 33, air is pumped from the core of the vortex 50 through vortex ducts 23 and openings 30 which strengthens and maintains vortex 50 to provide the necessary lift to aircraft 1. The lift force manifests itself as a lowering of the air pressure above any surface beneath the vortex (deck 11 and the outer curved inside surface of duct bends 25).

Shield 18 will be in fully extended position with inlet duct opening panels 36 being in retracted position when aircraft 1 is preparing for takeoff. Thrust engine 31 moves aircraft 1 down the runway producing free vortex 50 above deck 11 and through vortex guiding duct 21 providing the necessary lift for takeoff. After aircraft 1 has achieved sufficient altitude, shield 18 is retracted simultaneously with the closing of inlet cover panels 36 to extinguish vortex 50.

Closure panels 36 move inwardly across duct openings 24 when extinguishing vortex 50. Because of its arcuate shape, the effective width of the shield 18 decreases as it is retracted. Both of these make the vortex shorter as it gets weaker. Such a shorter vortex is more stable than a longer weaker vortex which would result if the closure panels moved from an inner to an outer position or if the shield did not have an arcuate shape. The inward or inboard movement of panels 36 instead of outward movement and the decreasing effective width of arcuate shield 18 as it is retracted, prevent an undesirable rapid extinguishing of the vortex and allow a more gradual transition from vortex generated lift to conventional lift, the conventional lift starting at the outboard areas of the aircraft and moving inboard. A more stable aircraft results. It may be desirable to set the choke 40 in a partially closed position during at least part of the time when the shield 18 is being retracted and the closure panels 36 are moved inwardly across the duct openings. This increases the rate at which air is pumped by engine 31 through the vortex duct openings and helps to stabilize the vortex. The speed of aircraft 1 can be increased considerably after extinguishing of vortex 50 by retraction of shield 18 with thruster engine 31 providing the power. Aircraft 1, after extinguishing vortex 50, becomes a usual streamlined lifting body aircraft.

Figure 8:
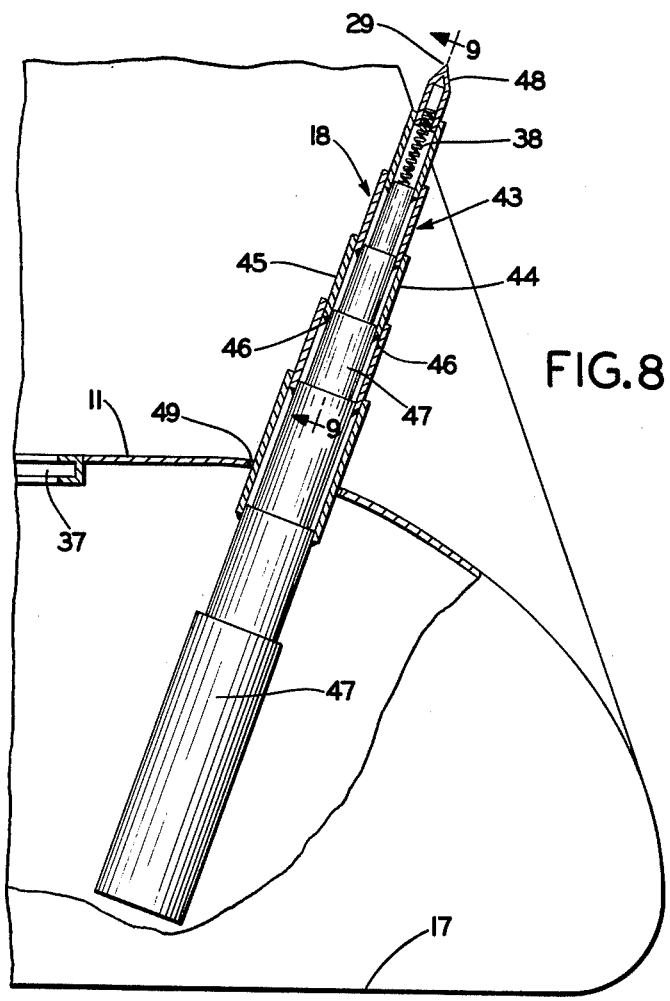
FIG. 8 is a greatly enlarged fragmentary sectional view taken on line 8—8, FIG. 7, showing the retracting mechanism for the vortex producing shield.

Shield 18 is moved from its retracted position of FIG. 10 to its fully extended position of FIG. 8 simultaneously with the opening of inlet duct closure panels 36 prior to aircraft 1 starting its landing descent. A vortex 50 is formed above deck 11 in vortex forming region 19 and is stabilized and strengthened by the movement of air through duct inlet openings 24, as shown in FIG. 6. This recreated vortex 50 provides an increased lifting force with a minimum of speed for aircraft 1, enabling a shorter runway to be utilized and with increased safety due to the low landing speed.

Fins 7 and 8 perform the usual stabilizing functions while the aircraft is in flight. Fins 7, which may extend vertically if desired, also assist in strengthening vortex 50 by partially enclosing vortex forming region 19. This enclosing reduces the effect of side winds on vortex 50 and assists in maintaining a low pressure within region 19. Vortex guide duct 21 may be eliminated within main body section 3 with the hollow interior thereof providing the region through which lower vortex sections 52 are formed without affecting the concept of the invention. Cylindrical duct sections 23 and duct bends 25, as shown in the drawings, are preferable to such a hollow frame interior since less turbulence is produced and a stronger vortex created with the cylindrical duct sections.

One of the major differences between the construction and operation of aircraft construction 1 in contrast to the free vortex aircraft construction disclosed in my Patent No. 3,934,844 is that the vortex forms almost a complete circle or closed path. Half of the vortex is outside of the aircraft in vortex producing region 19, with the other half of the vortex being located inside the aircraft in vortex guiding duct 21. The core of vortex 50 also is pumped by a single propeller 33 located within thruster duct 22 eliminating a pair of pumping engines. Outside portion 51 or vortex 50 is similar to the vortex produced in my previous free vortex aircraft and causes most of the lift on aircraft 1.

In order to maintain the vortex at a low pressure, it is necessary continuously to pump air from the core of the vortex, which is guided to propeller 33 through openings 30 which provide passages between vortex ducts 23 and thruster duct 22. The main function of vortex guide duct 21 is to serve as a conduit to guide the vortex to propeller 33. Relatively little suction is created at inlet openings 24 of the vortex ducts. The main air motion in the ducts is in the rotational motion of the vortex and not in linear motion through vortex ducts 23 and into and out of thruster duct 22. In fact, the vortex tends to prevent air from entering the vortex ducts except to replace the relatively small amount of air pumped from the vortex by propeller 33 in comparison to the extremely high speed air flow through thruster duct 22.

Accordingly, the improved free vortex aircraft construction provides a wingless aircraft can have various simple external configurations and in which the frame is nonrotating, thereby being suitable for human occupants; provides an aircraft which uses the principle of a free vortex to provide the lift for the aircraft during takeoff and landing procedures and when moving at low speeds, and in which the vortex producing shield and pumping means can be eliminated, enabling the speed of the aircraft to be increased considerably after takeoff; provides an aircraft construction in which only a single centrally mounted engine is required to provide the forward thrust and the vortex core pumping action, thereby reducing the cost of the aircraft, and which eliminates synchronizing problems and undesirable yaw which occur when a plurality of spaced engines are used; and provides a construction which is effective, safe, inexpensive and efficient in assembly, operation and use, and which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved free vortex aircraft is constructed and used, the characteristics of the construction, and the advantageous, new and useful results obtained; the new and useful structures, devices, elements, arrangements, parts, and combinations, are set forth in the appended claims.

I claim:

1. Improved free vortex aircraft construction including:
   (a) frame means;
   (b) shield means mounted on the frame means to generate and shed a substantial amount of vorticity into the air when the aircraft moves forwardly through the air, with said shield means and frame means providing an upper vortex forming zone downwind of the shield means;
   (c) vortex duct means located within the frame means, generally beneath the upper vortex forming zone, and extending transversely across the frame means providing a lower vortex zone, with said duct means being provided with a pair of spaced inlet openings communicating with the ends of the upper vortex forming zone;
   (d) thruster air duct means located within and extending longitudinally along the frame means and communicating with the vortex duct means intermediate the spaced inlet openings; and
   (e) engine means mounted centrally on the frame means and communicating with the thruster duct means to provide thrust for moving the aircraft forwardly through the air and for pumping air from the upper vortex forming zone through the inlet duct openings and vortex duct means to retain and concentrate the vorticity within said upper vortex zone to form a free vortex of low pressure air extending in a generally circular manner across the frame means and through the vortex duct means, with said free vortex acting on the frame means and vortex duct means to produce lift on the aircraft.

2. The construction defined in claim 1 in which the shield means is movably mounted on the frame means for moving said shield means between extended and retracted positions; and in which closure means are movably mounted with respect to the spaced inlet openings of the vortex duct means for opening and closing said inlet openings for creating the free vortex when the shield means is in extended position and the inlet openings are open, and for extinguishing the free vortex by moving the shield means to retracted position and closing the inlet openings.

3. The construction defined in claim 2 in which the shield means includes a plurality of telescopically mounted shield sections; and in which piston means is operatively connected to the shield sections for telescopically retracting said shield sections within the frame to eliminate the vorticity forming zone.

4. The construction defined in claim 2 in which closure means includes a pair of flexible panels slidably mounted on the frame means adjacent the vortex duct means inlet openings for opening and closing movement across said openings.

5. The construction defined in claim 4 in which the closure panels move inboard toward each other upon closing of the inlet openings.

6. The construction defined in claim 1 in which the thruster duct means includes a conical front portion and a cylindrical rear portion; in which the vortex duct means communicates with the cylindrical portion of the thruster duct means; and in which the engine means includes a propeller located rearwardly of the junction between the thruster and vortex duct means for pumping air from the upper vortex forming zone through the vortex duct means.

7. The construction defined in claim 2 in which the shield means is adapted to move between extended and retracted positions generally simultaneously with the opening and closing of the inlet openings by the closure means.

8. The construction defined in claim 1 in which the shield means has a sharp top edge to increase the vorticity shed by the shield means into the upper vortex forming zone.

9. The construction defined in claim 1 in which the shield means has an outwardly curved convex arcuate shape.

10. Improved free vortex aircraft construction including:
   (a) frame means;
   (b) shield means mounted on the frame means to generate and shed a substantial amount of vorticity into the air when the aircraft moves forwardly through the air, with said shield means and frame means providing an upper vortex forming zone downwind of the shield means;
   (c) duct means located within the frame means and extending transversely across the frame means and generally beneath the upper vortex forming zone providing a lower vortex zone;
   (d) the duct means being provided with a pair of spaced inlet openings, with said inlet openings being located adjacent the ends of the upper vortex forming zone;
   (e) engine means mounted on the frame means to provide thrust for moving the aircraft forwardly through the air and for pumping air from the upper vortex forming zone through the spaced inlet duct openings and lower vortex zone to retain and concentrate the vorticity within said zones to form a free vortex of low pressure air extending in a generally circular manner across the frame means and through the duct means; and
   (f) means for retracting the shield means within the frame means for extinguishing the free vortex after the aircraft is in flight.

11. The construction defined in claim 10 in which panel means are movably mounted on the frame means for selectively opening and closing the vortex duct means inlet openings for controlling the pumping of air from the upper vortex forming zone.

12. The construction defined in claim 10 in which thruster duct mean is mounted on the frame means and extends longitudinally centrally of the frame means; in which the engine means is mounted in the thruster duct means for drawing air rearwardly through said thruster duct means to provide forward thrust to the aircraft; and in which the vortex duct means communicates with the thruster duct means, whereby the engine means pumps air through the vortex duct means simultaneously with providing forward thrust to the aircraft.

13. The construction defined in claim 10 in which choke means is mounted in the thruster duct means for controlling the amount of air flowing through said thruster duct means.

14. The construction defined in claim 11 in which the shield means has a sharp top edge to increase the vorticity shed by the shield means into the upper vortex forming zone; and in which said shield means has an arcuate outwardly curved convex shape.

15. An improved free vortex aircraft construction of the type having a frame with shield means mounted thereon providing an upper vortex forming zone downwind of the shield means, and engine means to provide thrust for moving the aircraft through the air and for pumping air from spaced locations of the upper vortex forming zone to retain and concentrate the vorticity within said upper zone to form a free vortex of low pressure air having an upper portion extending in an arcuate manner across the frame, wherein the improvement includes:
   (a) duct means mounted within the frame and extending transversely across the frame and generally beneath the upper vortex forming zone to form a guide for a lower portion of the free vortex whereby the free vortex extends in a generally circular path across the upper vortex forming zone and through the duct means;
   (b) the duct means terminating in and forming a pair of spaced inlet openings at the ends of the upper vortex forming zone through which the engine means pumps air from said upper vortex forming zone and through which the free vortex extends;
   (c) panel means movably mounted with respect to the frame for opening and closing the duct means inlet openings to regulate the pumping of air from the upper vortex forming zone; and
   (d) means operatively connected to the shield means for raising and lowering the shield means with respect to the frame for extinguishing the formation of the free vortex after the aircraft is in flight.

16. The construction defined in claim 15 in which the engine means includes a single engine mounted centrally on the frame; in which thruster air duct means extends longitudinally through the frame, with the engine communicating with the thruster duct means for drawing air rearwardly through said duct means providing forward thrust to the aircraft; and in which the vortex duct means communicates with the thruster duct means, with the engine pumping air from the upper vortex forming zone simultaneously with providing forward thrust to the aircraft when the panel means are in open position.

17. The construction defined in claim 16 in which the thruster duct means includes a front conical section and a rear generally cylindrical section; in which the vortex duct means includes a pair of cylindrical ducts, each of which communicates with and extends transversely outwardly in opposite directions from the rear section of the thruster duct means; and in which the pair of vortex ducts terminate in generally 90° bends which form the spaced inlet openings.

18. The constrution defined in claim 16 in which choke means communicate with the thruster air duct means to regulate the flow of air through said thruster duct means.

19. The construction defined in claim 15 in which the frame includes fin means adjacent the ends of the upper vortex forming zone; and in which the panel means are movably mounted within said fin means.

* * * * *

UNITED STATES PATENT OFFICE
CERTIFICATE OF CORRECTION

Patent No. 4,093,160            Dated June 6, 1978

Inventor(s) Ray R. Reighart II

It is certified that error appears in the above-identified patent and that said Letters Patent are hereby corrected as shown below:

Column 1, line 27 "alos should read -- also --.

Column 5, line 57, "end" should read -- ends --.

Column 7, line 26, between "aircraft"and "can" insert -- which --

Column 8, line 48 between "frame" and "to" insert -- means --.

Column 9, line 47, "mean" should read -- means --.

Signed and Sealed this

Thirty-first Day of October 1978

[SEAL]

Attest:

RUTH C. MASON
Attesting Officer

DONALD W. BANNER
Commissioner of Patents and Trademarks